United States Patent [19]
Schnaibel et al.

[11] Patent Number: 5,177,959
[45] Date of Patent: Jan. 12, 1993

[54] METHOD AND ARRANGEMENT FOR MONITORING THE CONVERSION RATE OF A CATALYZER IN THE EXHAUST-GAS SYSTEM OF AN INTERNAL COMBUSTION ENGINE

[75] Inventors: Eberhard Schnaibel, Hemmingen; Erich Schneider, Kirchheim, both of Fed. Rep. of Germany

[73] Assignee: Robert Bosch GmbH, Stuttgart, Fed. Rep. of Germany

[21] Appl. No.: 777,284
[22] PCT Filed: Feb. 27, 1991
[86] PCT No.: PCT/DE91/00155
§ 371 Date: Nov. 29, 1991
§ 102(e) Date: Nov. 29, 1991
[87] PCT Pub. No.: WO91/14861
PCT Pub. Date: Oct. 3, 1991

[30] Foreign Application Priority Data

Mar. 28, 1990 [DE] Fed. Rep. of Germany ....... 4009901

[51] Int. Cl.⁵ .................................................. F01N 3/20
[52] U.S. Cl. .......................................... 60/274; 60/276; 60/277
[58] Field of Search .......................... 60/274, 276, 277

[56] References Cited

U.S. PATENT DOCUMENTS 4,884,066 11/1989 Miyata .................................... 60/277

FOREIGN PATENT DOCUMENTS 45913 2/1989 Japan ...................................... 60/276

*Primary Examiner*—Douglas Hart
*Attorney, Agent, or Firm*—Walter Ottesen

[57] ABSTRACT

A method as well as an arrangement for monitoring the conversion rate of a catalyzer in the exhaust-gas system of an internal combustion engine is suggested by using a lambda probe upstream and downstream of the catalyzer. An inquiry is made as to whether the individual lambda probe signals exceed specific permissibility ranges and the conclusion drawn as to the conversion rate or the operability of the catalyzer.

11 Claims, 5 Drawing Sheets

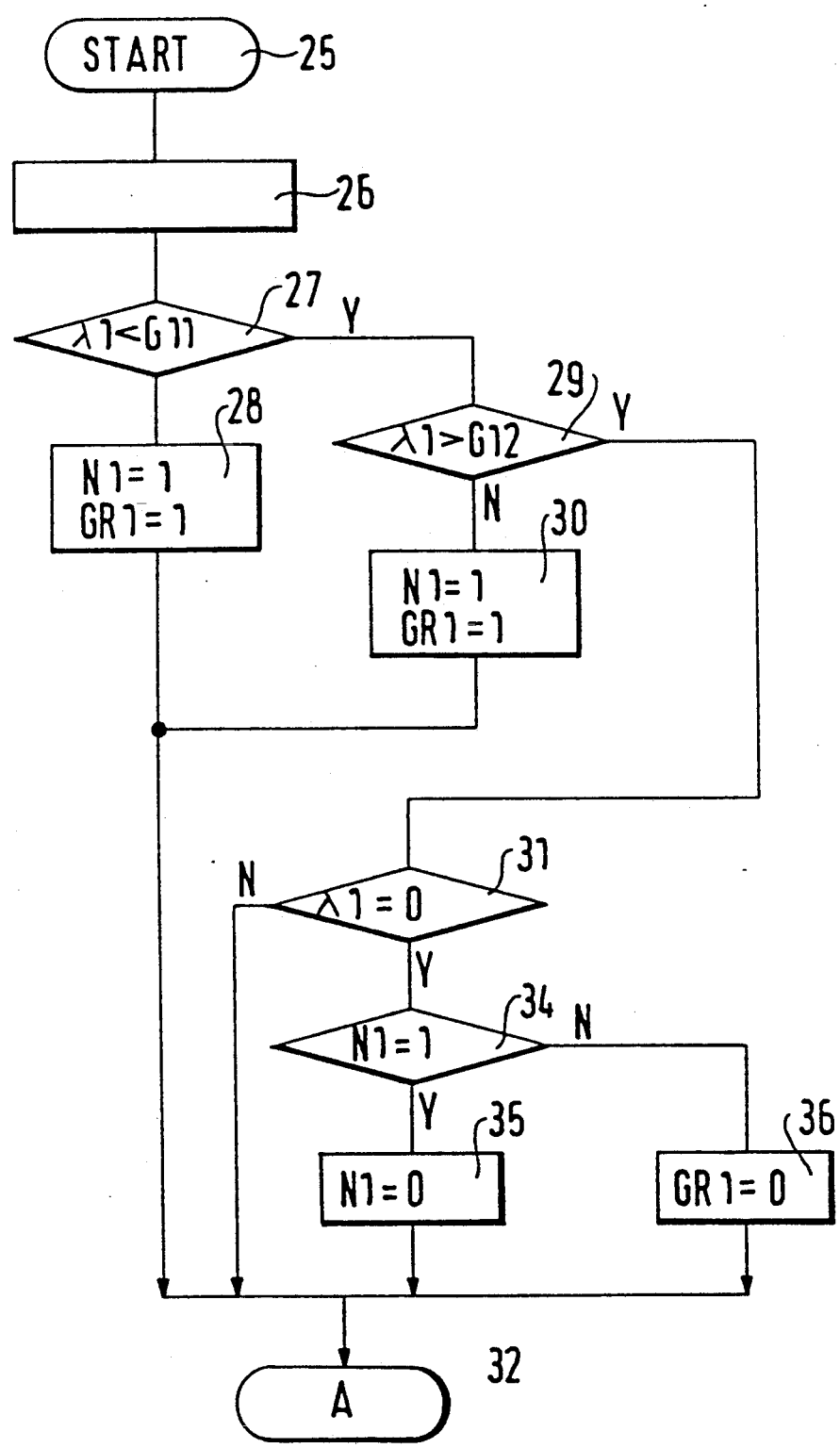

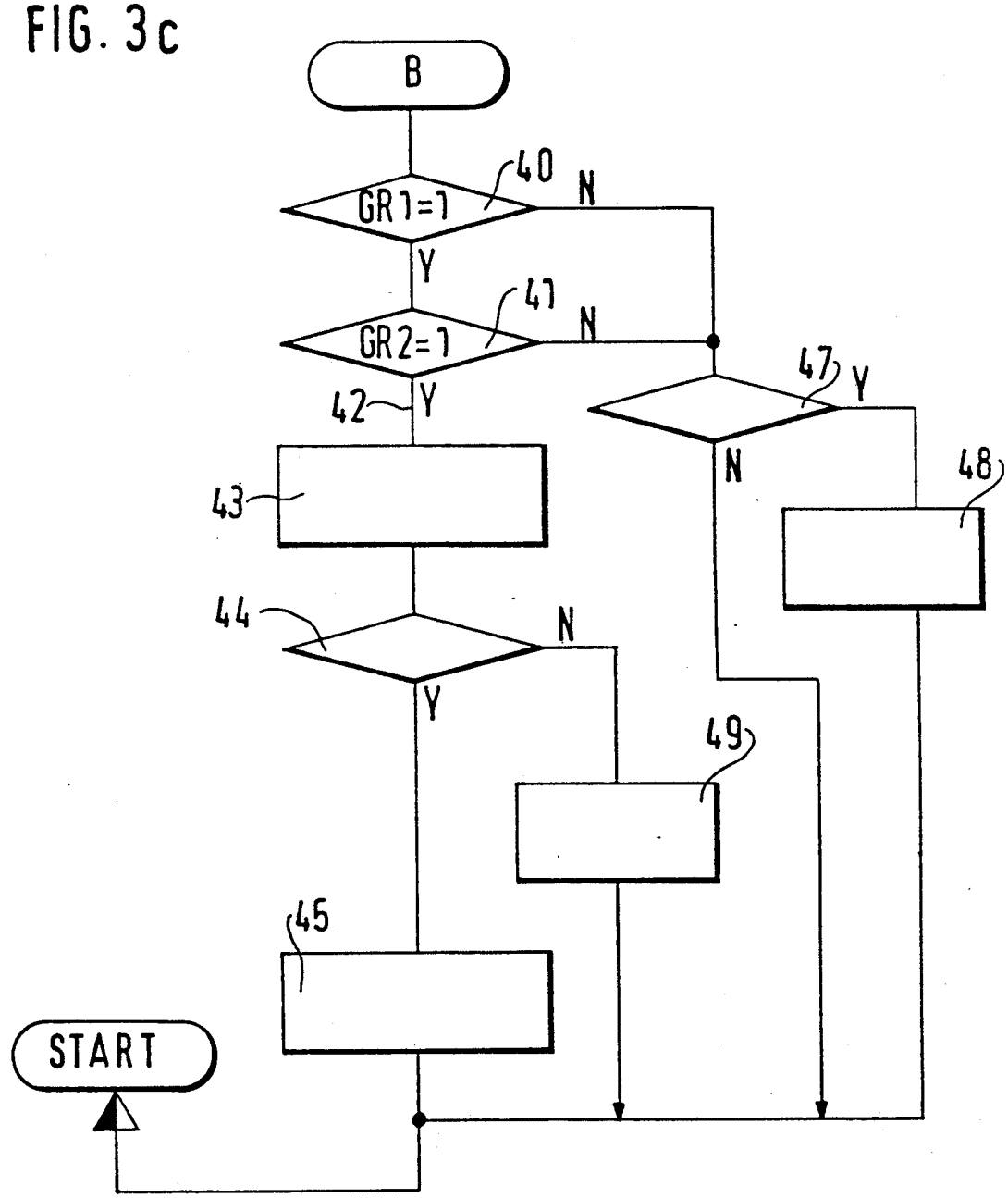

5,177,959

METHOD AND ARRANGEMENT FOR MONITORING THE CONVERSION RATE OF A CATALYZER IN THE EXHAUST-GAS SYSTEM OF AN INTERNAL COMBUSTION ENGINE

FIELD OF THE INVENTION

The invention relates to a method and an arrangement for monitoring the conversion rate of a catalyzer which is disposed in the exhaust-gas system of an internal combustion engine.

BACKGROUND OF THE INVENTION

It is generally known to transform harmful components of exhaust gases of an internal combustion engine such as HC, $NO_x$ and CO into substantially non-toxic gases by means of a catalyzer which is mounted in the exhaust-gas system of an internal combustion engine.

However, it is decisive for the so-called conversion rate that the oxygen content of the exhaust gas lies within optimal values. For a so-called three-way catalyzer, these optimal values lie in a narrow range about the value which corresponds to an air/fuel mixture of lambda = 1.

In order to maintain this narrow range, it is conventional, as is well known, to control the air/fuel ratio for an internal combustion engine by means of oxygen probes (lambda probes) which are disposed in the exhaust gas system of the internal combustion engine.

In addition to the control on the basis of the signal of the oxygen probe, the determination of a so-called precontrol value based on operating characteristic variables of the internal combustion engine especially the air quantity Q and the engine speed n takes place in order to accelerate the control operation especially in the crossover regions. The determination of the air quantity Q can take place in various ways such as via the determination of the opening angle of a throttle flap or based upon the signal of an air-flow sensor.

The precontrol value determined on the basis of air quantity and engine speed is corrected in dependence upon the signal of the oxygen probe in such a manner that the optimal air/fuel mixture is determined. This corrected signal then drives a fuel-metering device which supplies the optimal quantity of fuel to the internal combustion engine.

If a fuel injection unit is used as the fuel-metering device, then the drive signal supplied to the injection device defines a so-called injection time ti which defines a direct measure for the quantity of fuel supplied per work stroke for the necessary conditions such as constant fuel pressure ahead of the injection valves and the like.

For other fuel-metering devices, their drive signal is to be correspondingly determined. This is known to persons working in the field. In the following, the invention will be described in the context of a fuel injection device without being limited thereto.

Furthermore, in U.S. patent application Ser. No. 679,050, filed May 9, 1991, a system has been introduced which utilizes two lambda probes for controlling the air/fuel mixture with a first lambda probe being disposed forward of a catalyzer and the second lambda probe being disposed rearward thereof.

The signal of the second lambda probe is compared to a desired value with the difference of the two values being integrated and the value obtained in this way serves as the desired value for the signal of the first lambda probe.

A system is further known from U.S. Pat. No. 4,622,809 which utilizes the signal of a lambda probe arranged ahead of the catalyzer for controlling the air/fuel mixture and the signal of a second lambda probe for monitoring the conversion rate of the catalyzer.

The signal value supplied by the second probe and its mean value are determined, and the operating point of the control system is changed as long as there is a deviation of the mean value from a pregiven value until the mean value has reached its desired value.

If the mean value is at the pregiven value, then a fault signal is supplied when maximum values of the amplitude of the sensor signal are exceeded. In this way, the necessity is signalled when required to exchange the catalyzer.

SUMMARY OF THE INVENTION

The object of the invention is to further optimize the known systems.

The method and the arrangement of the invention permit the signal of a first lambda probe arranged ahead of the catalyzer and the signal of a second lambda probe arranged after the catalyzer to be compared and to derive therefrom a reliable statement as to the conversion rate of the catalyzer.

BRIEF DESCRIPTION OF THE DRAWINGS

The embodiments are shown in the drawing and will be described and explained in more detail in the following.

Shown are.

DESCRIPTION OF THE PREFERRED EMBODIMENTS OF THE INVENTION

Figure 1:
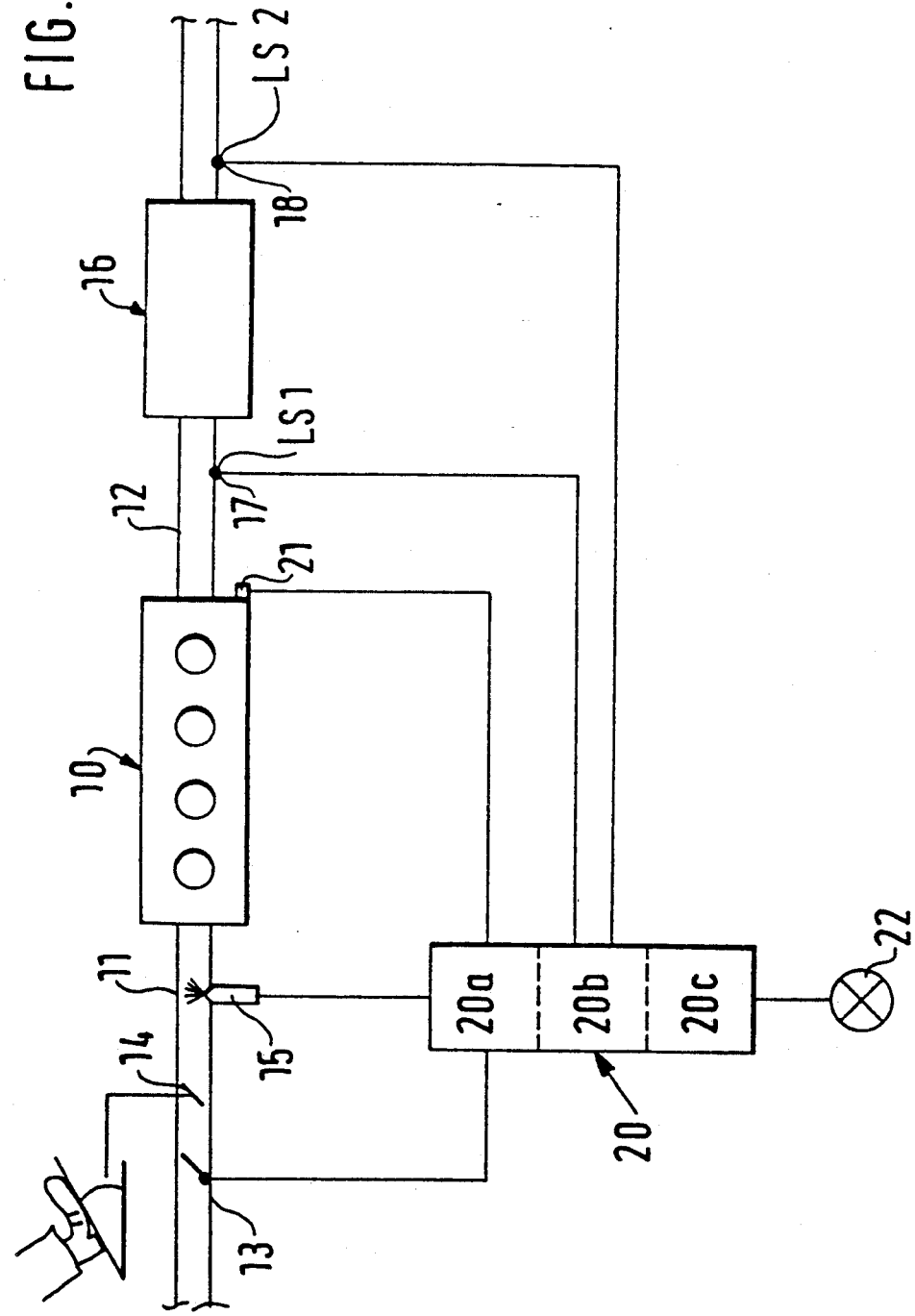
FIG. 1: a simplified overview of a system for controlling the air/fuel mixture of an internal combustion engine.

The embodiment relates to a method and an arrangement for monitoring the conversion rate of a catalyzer in the exhaust-gas system of an internal combustion engine.

Before the embodiments are explained in detail, it is pointed out that in the following, only control elements and actuator elements for operating the engine are mentioned which are important for explaining the invention. It is understood that further steps are required to satisfactorily operate the internal combustion engine in accordance with the exhaust gas requirements which are becoming evermore stringent. To this belong, for example, the areas of tank ventilation, the idle control, the exhaust gas feedback, etc.

These areas are known to the expert and it is understood that individual ones or several of these areas can be operated in combination with the system according to the invention.

Furthermore, it is also possible to adapt individual drive signals of the mentioned areas and also of the system of the invention in dependence upon operating characteristic variables of the internal combustion engine, that is, to adapt to the particular situations.

Adaptation methods are also known to the expert so that they need not be explained in detail.

The stages shown in the drawing for the open-loop/closed-loop control of the internal combustion engine are shown separately in order to explain the invention. Conventionally, the stages are integrated into an electronic control unit or are provided as part of a control program for a microcomputer which can be configured as part of the electronic control unit.

In FIG. 1, 10 identifies the internal combustion engine to which an air intake pipe 11 leads and from which an exhaust gas line 12 leads away. In the air intake pipe 11, an air-flow sensor 13, a throttle flap 14 as well an injection valve 15 lie one behind the other. The following are disposed in the exhaust-gas line: a catalyzer 16 with a first lambda probe 17 upstream thereof and a second lambda probe 18 downstream thereof.

A control apparatus 20 having component regions 20a, 20b and 20c receives signals of the air-flow sensor 13 as well as of an engine-speed sensor 21 and also the output signals of the two lambda probes 17 and 18. At the output end, the control apparatus 20 generates drive signals at least for the injection valve 15 as well as for a display unit 22. The individual areas of the control apparatus 20 identify: with 20a, the preprocessing of the injection signal for the injection valve 15; with 20b, signal processing for the individual signals of the lambda probes 17 and 18; and, with 20c, a diagnostic unit for the conversion quality of the catalyzer 16 with a corresponding drive of the display unit 22.

The basic structure of a fuel injection system having lambda control (shown in FIG. 1) is known as such as, for example, from U.S. Pat. No. 4,622,809 mentioned in the state of the art.

Starting from a load signal from the air-flow sensor 13 as well as the engine-speed signal from the engine-speed sensor 21, a precontrol value for the injection quantity is formed. This value is thereafter corrected in dependence upon at least one signal of the two lambda probes 17 and 18 in the sense of an adjustment as optimal as possible for the particular operating condition of the internal combustion engine.

The invention then relates to the type and manner as to how the conversion rate of the catalyzer 16 can be detected. This is explained with respect to the signal illustration of FIG. 2.

Figure 2:
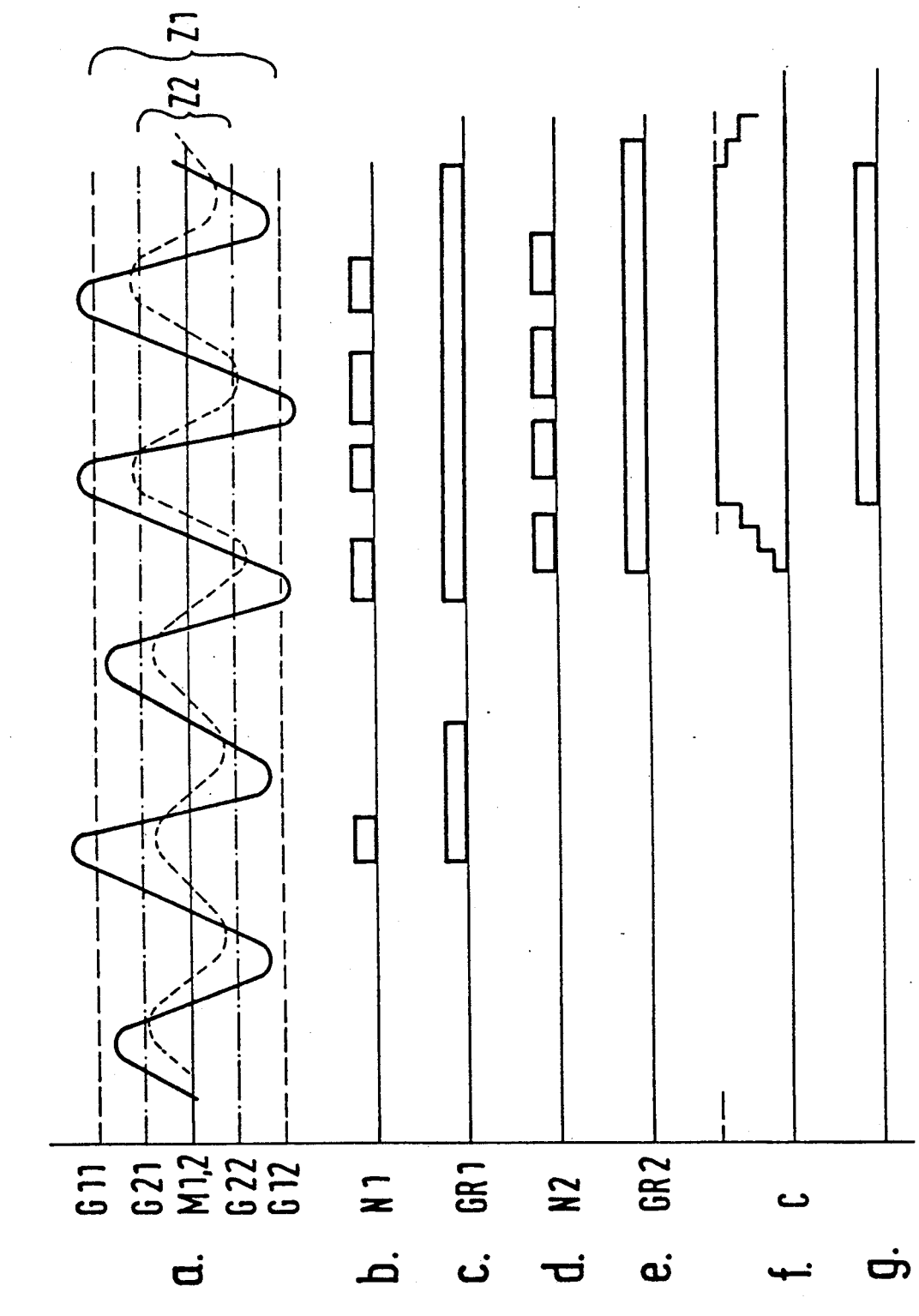
FIG. 2: signal traces in combination with the method according to the invention.

FIG. 2 shows the output signals of both lambda probes 17 and 18 of FIG. 1 already drawn in linearized form as a function of time. The trace having the solid line provides the signal for the probe 17 upstream of the catalyzer 16 and the trace with the line drawn broken provides the linearized signal of the probe 18 downstream of the catalyzer. Mean values M1 and M2 are assigned to the respective probe signals. They show identical values in the illustration of FIG. 2a for the reason of simplicity. Furthermore, the two probe signals are assigned permissibility ranges Z1 and Z2 with the limits (G11, G12) and (G21, G22), respectively.

Signals are formed starting with the traces of FIG. 2a in dependence upon individual thresholds being exceeded or there being a drop therebelow. These signals are shown in FIGS. 2a to 2g. Thus, FIG. 2b shows a signal trace which shows the setting of a first flag N1 whenever the signal of the first lambda probe 17 exceeds the upper threshold value G11. This flag N1 is reset when this probe signal exceeds the mean value M1. The same applies also when there is a drop below the threshold G12 up to when the mean value 1 is subsequently reached. This means that the flag N1 is always then set when the signal of the first lambda probe 17 leaves a permissibility range Z1. The flag N1 is cancelled when the mean value M1 is exceeded or there is a drop below this value.

FIG. 2c characterizes a further flag GR1. This flag is always then set in correspondence to the conditions present at the formation of the flag N1 when the permissibility range Z1 of the lambda probe is left; however, only with the second crossover of the mean value M1, is the flag GR1 reset if the probe signal, between the crossover of the two last mean values, remained within the permissibility range.

FIG. 2d and FIG. 2e show the corresponding relationships with reference to the signal of the second lambda probe 18 downstream of the catalyzer 16. The formation of the two flags N2 and GR2 takes place in correspondence to the conditions at the formation of the flags N1 and GR1 the occurrence of which is shown in FIGS. 2b and 2c.

If the two flags GR1 and GR2 are set in accordance with FIGS. 2c and 2e, then a counting operation begins in correspondence to FIG. 2f. The counting operation continues until a specific threshold value is reached. If one of the flags GR1 and GR2 is cancelled, then a counting operation takes place in the opposite direction in order to possibly again return to the initial position.

FIG. 2g shows a fault signal for a time duration which corresponds to that which shows the counter position at a high level. This fault signal or alarm signal of FIG. 2g is an indication that the catalyzer no longer operates correctly and should cause the driver of the vehicle to go to a service station.

A flowchart for realizing the individual signal images of FIG. 2 is shown in FIG. 3.

There, 25 shows the start of the program sequence. Thereafter, with the initialization (26) all variables are set to zero. From there, the first inquiry 27 of the signal of the first lambda probe 17 determines whether the upper limit value G11 has not been exceeded. In the case of a no-decision the two flags N1 and GR1 are each set to 1 in block 28.

With a yes-decision in the inquiry unit 27, a further inquiry follows as to whether the probe signal lies above the limit value GR12. If this is not the case, that is, the permissibility range Z1 was left in the downward direction, then the flags N1 and GR1 are likewise set to 1 in block 30.

If the signal of the lambda probe 17 corresponding to the inquiry in 29 lies within the permissibility range Z1, then a sign change is detected in the probe signal in the next inquiry unit 31. If a sign change is not present, then the program (shown in the figure) goes to intermediate step A (32) to which also the program sequence leads after the pass-through of blocks 28 and 30. If a sign change is detected in 31, then a determination is made in the following inquiry unit 34 as to whether the flag N1=1 has been set or not. If this is the case, then the flag is reset in block 35; otherwise, in block 36, the flag GR1 is set to zero.

Figure 3B:
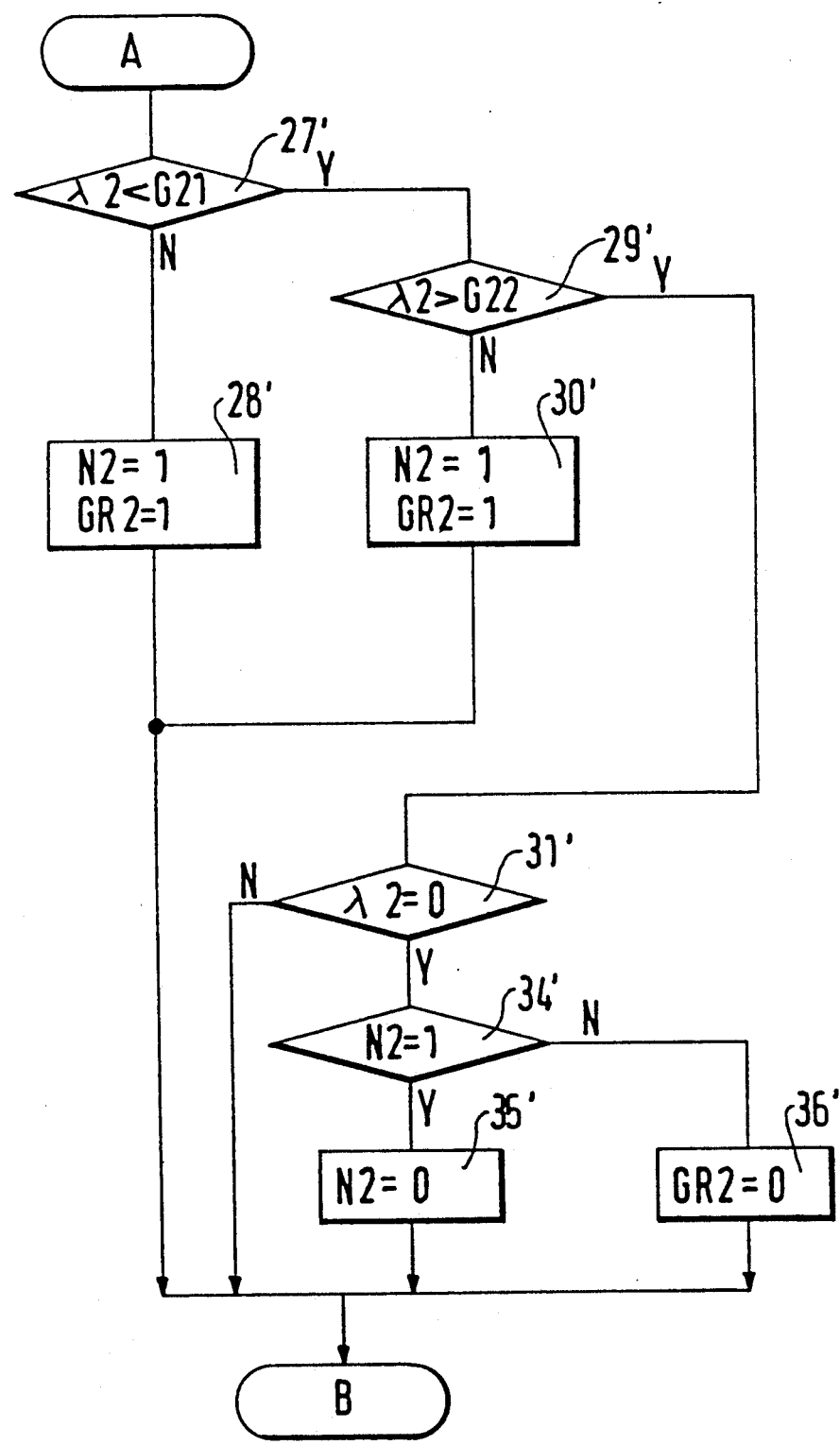
FIG. 3: flowchart (in three parts) for explaining the method according to the invention and the operation of the arrangement according to the invention.

FIG. 3b shows the conditions in the program sequence after reaching the program crossover point A of FIG. 3a. There, the flowchart of FIG. 3b has the same structure as the flowchart of FIG. 3a with the difference that here the signal trace of the second lambda probe 18 is interrogated as to whether the two thresholds G21 and G22 were reached with the possibility of setting the two flags N1 and GR2. Furthermore, a detection is made if the mean value M2 is exceeded or if there is drop therebelow with a subsequent possible reset of flags N2 and GR2. The individual program stages are provided in FIGS. 3b with those reference numerals known from FIG. 3a supplemented by a prime (').

FIG. 3c likewise shows in the flowchart the conditions when forming the signals of FIGS. 2f and 2g. An inquiry unit 40 detects the presence of a set flag GR1. If a set flag GR1 is detected, then a corresponding inquiry follows in 41 with reference to the flag GR2. If this flag too is set, then a fault signal is set on a line 42 and a downstream counter 43 is charged by means of a time synchronous or occurrence synchronous signal. As an occurrence, the appearance of a mean value can be considered for example. The counter result is detected in the inquiry unit 44 and a fault announcement is then emitted in block 45 when the counter value has reached a specific limit. Thereafter, the program sequence returns to the start point 25 or returns to the start of the initialization 26.

If one of the flags GR1 or GR2 was not set, then the program goes to an inquiry unit 47. In the inquiry unit, the detection is made as to whether the count value in the counter 43 is greater than zero. If the result is "yes", then the counter 43 counts down corresponding to a specific incrementation (block 48). If the counter value was however already zero, then the program runthrough is started again. If the limit value in the counter 43 corresponding to the result in the inquiry unit 44 had not yet been reached then a selectable incrementation follows with block 49.

In other words, the program sequence of FIGS. 3a to 3c shows as follows.

FIG. 3a: with the initialization, all variables are set to 0. For the probe signal of the lambda probe ahead of the catalyzer, there are two limit values: GR11 as the lower limit value and GR12 as upper limit value and, two flags: N1 as "zero crossover flag" and GR1 as "limit exceeding flag".

When the limit value GR12 or GR11 is exceeded or there is a drop therebelow, the marks N1 and GR1 are set. If, for example, the mean or mid value of GR11 and GR12 are identified as "zero", then an inquiry is made of flag N1 with every sign change (zero crossover) of the probe signal.

If the flag N1 is already 0, then a limit value has not been exceeded between the last "zero crossover" and this "zero crossover". Therefore, the flag GR1=0 is set.

If the flag N1=1, then the flag N1=0 is set and the flag GR1 is not influenced.

If the limit value is exceeded ahead of every "zero crossover" then the flag GR1 is always 1.

For the probe signal of the probe downstream of the catalyzer, the same illustration applies; however, with changed index (FIG. 3b).

If the limit value is always exceeded between two "zero crossovers", then the flag GR2 is likewise always 1.

If both flags GR1 and GR2 are simultaneously 1, then a fault is assumed and the fault counter "counts up". When a limit value is exceeded, a fault is indicated because then the conversion is faulty.

FIG. 3a: when the lower limit value is exceeded, then GR1 and N1 are set so that GR1=1 and N1=1. If the limit value is not exceeded, a check is made as to whether the upper limit value is exceeded. If the upper limit value is exceeded, then N1 and GR1 are likewise set so that N1=1 and GR1=1. If none of the limit values are exceeded, then a check is made as to whether a sign change is present with respect to a mean value (0).

With a sign change, the following inquiry takes place:
N1=0=>GR1=0 or
N1=1=>N1=0

FIG. 3b: corresponding program sequence as in FIG. 3a.

FIG. 3c: when flags GR1 and GR2 are set, then a fault counter "counts up" with a specific incremental width. If the fault counter exceeds a limit value, then a fault announcement takes place. If both flags GR1 and GR2 are not=1 at the same time, then in the case that the fault counter is not at zero, this fault counter is again counted "rearwardly" with a specific increment width.

Variations of the system described above are conceivable and can take place in the following manner:

The limit values of the permissibility ranges Z1 and Z2 and/or the mean value are changeable, for example, in dependence upon operating characteristic variables.

For the probe signals, a centering can be advantageous with or without linearization.

It appears to be however especially necessary when doing without the linearization of the two probe signals, to introduce a centering of the signal downstream of the catalyzer.

For test purposes, the rearward probe voltage in this case is controlled, for example, to 450 mV in that, as known, the desired value of the main control is altered.

Only with this measure, the amplitude values originating from the non-linear probe characteristic are comparable.

We claim:

1. A method for monitoring the conversion rate of a catalyzer which is disposed in the exhaust-gas system of an internal combustion engine with a first lambda probe being arranged in the system upstream of the catalyzer and a second lambda probe being arranged in the exhaust-gas system downstream of the catalyzer, the signals of both probes serving to monitor the conversion rate, the method comprising the steps of:
   assigning permissibility ranges to said probe signals of Z1 and Z2 and means values M1 and M2 to the two probe signals, respectively;
   generating a fault signal when both probe signals exceed their permissibility ranges; and,
   emitting a fault announcement when said fault signal has occurred for a specific time duration.

2. The method of claim 1, wherein the specific time duration is determinable by means of a time counter.

3. The method of claim 1, wherein the fault signal is generated until, between the detection of two sequential means values of a signal, the permissibility range has not been exceeded for this signal.

4. The method of claim 1, wherein the limit values of the permissibility ranges are changeable.

5. The method of claim 1, wherein the signal of the second probe can be centered by means of a controller having an integral response.

6. The method of claim 1, wherein the specific time duration is determinable of means of an occurrence counter.

7. The method of claim 6, wherein the occurrence counter counts the presence of the mean values of at least one probe signal.

8. The method of claim 1, wherein the limit values of the mean values are changeable.

9. The method of claim 1, wherein the limit values of the permissibility ranges and the mean values are changeable.

10. An arrangement for monitoring the conversion rate of a catalyzer which is disposed in the exhaust-gas system of an internal combustion engine, the arrangement comprising:
  a first lambda probe for providing a first probe signal and being arranged in said exhaust-gas system upstream of said catalyzer;
  a second lambda probe for providing a second probe signal and being arranged in said exhaust-gas system downstream of said catalyzer;
  said first and second probe signals being assigned respective permissibility ranges Z1 and Z2; and,
  control means for receiving said first and second probe signals and including: means for processing said first and second probe signals to generate a fault signal when both of said probe signals have exceeded said permissibility ranges (Z1 and Z2); and, means for generating a fault announcement when said fault signal occurs for a predetermined time duration.

11. The arrangement of claim 10, further comprising means for generating said fault signal until, between the detection of two sequential means values M1 and M2 of said probe signals, respectively, the permissibility ranges for these signals where not exceeded.

* * * * *

UNITED STATES PATENT AND TRADEMARK OFFICE
CERTIFICATE OF CORRECTION

PATENT NO. : 5,177,959
DATED : January 12, 1993
INVENTOR(S) : Eberhard Schnaibel and Erich Schneider It is certified that error appears in the above-identified patent and that said Letters Patent is hereby corrected as shown below:

In the title page, under "References Cited": add the following reference
-- 4,622,809  11/86  Abthoff et al ............ 60/277 --.

In column 6, line 46: delete "means" and substitute -- mean -- therefor.

In column 6, line 56: delete "means" and substitute -- mean -- therefor.

In column 7, line 12: after "up", insert a hyphen.

In column 8, line 15: delete "where" and substitute -- were -- therefor.

Signed and Sealed this

Twenty-sixth Day of October, 1993

Attest:

BRUCE LEHMAN

Attesting Officer

Commissioner of Patents and Trademarks